Dec. 26, 1944. M. J. WEST 2,365,985
CONDUIT SUPPORT
Filed July 5, 1943
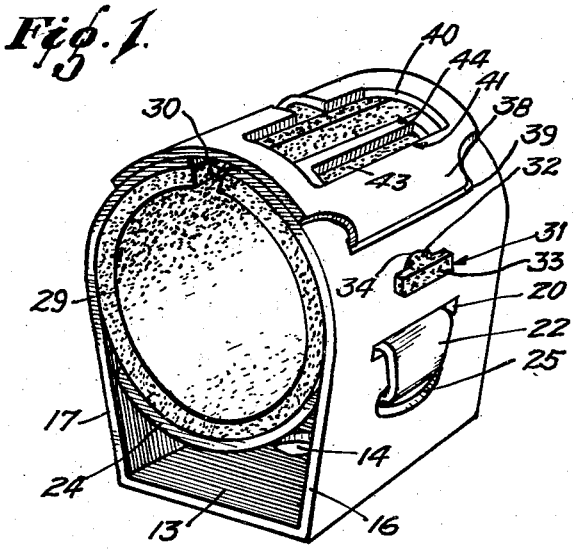
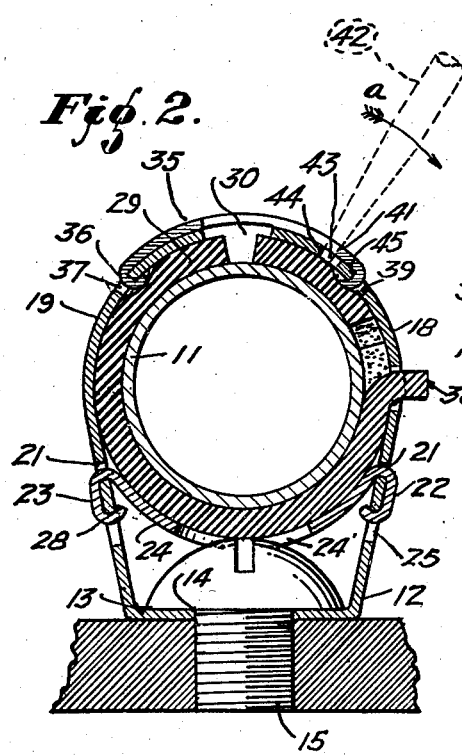
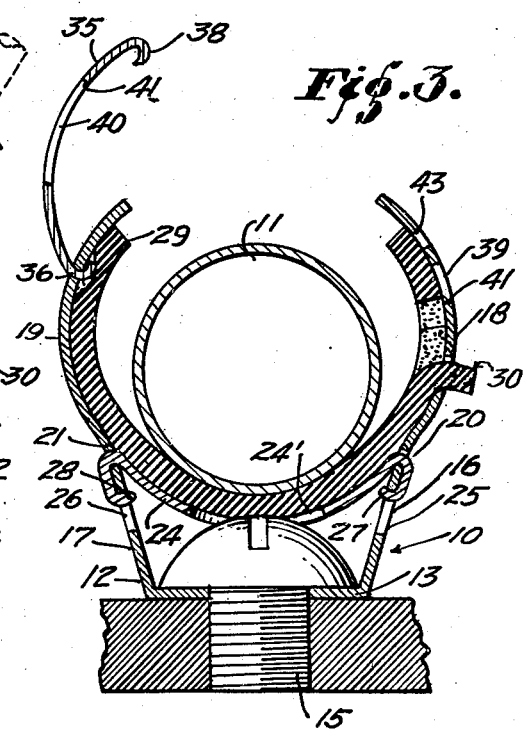
INVENTOR.
MERLE J. WEST.
BY James M. Abbett
ATTY Patented Dec. 26, 1944

2,365,985

UNITED STATES PATENT OFFICE 2,365,985

CONDUIT SUPPORT

Merle J. West, Los Angeles, Calif., assignor to William E. Vogel, Los Angeles, Calif.

Application July 5, 1943, Serial No. 493,627

6 Claims. (Cl. 248—74)

This invention relates to supporting elements of the character employed on aircraft and other similar installations, and particularly pertains to a conduit support.

In equipping airplanes and the like with conduits to be used in carrying electrical conductors or to perform the purpose of conveying fluids or liquids, it has been found necessary to provide a large number of conduit supports in each installation to anchor conduits with relation to fixed members and to hold the conduits in a manner to prevent excessive and objectionable vibration. Heretofore, various types of conduit supports have been provided for the purpose above mentioned. These structures for the most part have included a cushion member and fastening means for the support, which have made it necessary for the support to be detached entirely from a frame element upon which it is mounted in order to make it possible for the conduit to be placed in the seat of the support or to be removed therefrom. In many of the support structures now in use the means for clamping the support around the conduit and the means for fastening the support to its mounting are embodied in one fastening element which is not arranged in symmetrical relation to the support and conduit, and thus is subjected often to undue vibration with the result that the support becomes loosened from its mounting. In supporting structures now used the structures in many cases are such as to make it necessary for the supports to be applied to the conduit and fastened to a mounting member all in one operation. This is a cumbersome proceeding and increases the labor cost involved in installing, removing and replacing conduits.

It is the principal object of the present invention to provide a light-weight conduit support having one element adapted to be secured by a single screw to a mounting means, whereby the support is centrally mounted and balanced on the screw, the structure also including cushion means and independent latching means for insuring that the conduit will be completely encircled and positively gripped to be held in position and to be released therefrom.

The present invention contemplates the provision of a clip body formed of relatively thin light-weight metal to provide a central base and fastening portion and opposite arms between which a cushion is disposed and a conduit gripped, an arcuate bridge member being articulately connected to said arms to provide a saddle for the conduit and its cushion, the free ends of said arms being detachably secured together under appreciable tension by a simple and easily operated latch member.

The invention is illustrated by way of example in the accompanying drawing in which:

Figure 1 is a view in perspective showing the structure with which the present invention is concerned.

Fig. 2 is a view in end elevation showing a conduit locked in its seated position within the support.

Fig. 3 is a view similar to Fig. 2 showing the support unlatched and in a position to permit the conduit to be removed or replaced as desired.

Referring more particularly to the drawing, 10 indicates a mounting member, such as a frame portion of an airplane, and with relation to which a conduit 11 is to be supported. This conduit is circular and tubular in cross-section and may contain electrical conductors or may serve as a fluid or liquid passageway. It is to be understood that while the invention is explained as being used to support a metallic conduit, it is also to be understood that the device may be used to support a bundle of electrical conductors or the like. The support with which the invention is concerned comprises a body member 12 struck from a sheet or ribbon of metal of a suitable gauge to provide strength and rigidity, and at the same time to be sufficiently ductile to permit the parts to be bent or moved in a manner and for a purpose to be hereinafter explained. The central portion of the body member comprises a flat base plate 13 having a center perforation 14 therein to receive the shank of a screw 15. The screw 15 is threaded into the mounting member 10. Extending upwardly from opposite ends of the base plate 13 are side arms 16 and 17. These include flat portions formed as a continuation of the base plate 13 and terminate in arcuate portions 18 and 19. At the juncture of the flat portions and the arcuate portions perforations 20 and 21 are formed through the elements to receive end tangs 22 and 23 of a bridge or saddle 24. The element 24 is formed of strip metal agreeing in gauge and strength with that of the body member. The ends of the tangs extend downwardly and inwardly and into perforations 25 and 26 where the tangs are bent inwardly, as indicated at 27 and 28, to lock the bridge 24 with relation to the side arms 16 and 17. This arrangement provides an articulate connection between the side arms and the bridge and insures that the ends of the bridge 24 will remain in permanent assembly with the side arms when the bridge is flexed, as shown in Fig. 2, or is stretched from its flexed position to the position shown in Fig. 3. The developed length of the arcuate portion of the bridge 24 is such that when the side arms 16 and 17 are in their normal position, as indicated in Fig. 2, the bridge will form an arc which is concentric with the longitudinal axis of the conduit 11. At this time the arcuate portions 18 and 19 will also be concentric with the axis of the conduit 11 so that the combined developed length of the bridge 24 and the arcuate extensions 18 and 19 of the side arms will form a substantially complete circle embracing the conduit.

In order to prevent wear between the parts of the conduit support and the conduit, and also for the purpose of firmly gripping the conduit so that it will be held against movement with relation to the support and so that objectionable vibration will be eliminated, a cushion element 29 is provided and is disposed in a nested position as encompassed by the bridge 24 and the arcuate portions 18 and 19 of the side arms. This cushion is formed from a flat sheet of resilient and deformable non-metallic material, such for example as rubber or neoprene. The developed length of the cushion 29 is slightly less than the circumference of the conduit 11, so that a space 30 will occur between the ends of the cushion element when the conduit is fastened in position. This space provides clearance so that when the cushion is compressed and distended lengthwise it will be forced firmly around the conduit. The cushion element is held in interlocked relation to the body structure 12 by a locking tang 31 which is struck from the cushion element to form a T-shaped portion having a center connection 32 and an enlarged cross portion 33. The tang after having been struck from the cushion is forced outwardly through a perforation 34 in the side arms 16, after which the locking tang is permitted to restore itself to its original shape after being deformed to pass through the opening 34. Thus, it will be seen that without the use of cement or vulcanization, and without the necessity of forming the cushions by an extrusion method to produce a channel-shaped cushion, the cushion will be held in interlocked relation to the conduit support and will not become separated therefrom during transit or when the conduit is placed in its gripping position within the support.

The free ends of the arcuate portions 18 and 19 formed as a part of side arms 16 and 17 are gripped in their locked position around the conduit 11 and the cushion 29 by a lock plate 35. This plate is arcuate in shape so that it will conform to the outer arcuate surfaces of the free ends of the side arms. The width of this plate agrees with the width of the side arms and the arcuate length of the locking plate is substantially greater than the gap which occurs between the free ends of the arcuate portions 18 and 19 of the side arms and the gap 30 between the free ends of the cushion strip 29. At one end of the locking plate 35 one or more tangs 36 are provided which pass through a slot 37 here shown as formed in the arcuate portion 19 of the side arm 17. By this arrangement the locking plate 35 is articulately connected to the side arm so that it may have limited swinging movement from its locking position shown in Fig. 2 to its released position shown in Fig. 3. The opposite end of the locking plate is formed with a lock hook 38 which may pass through a slotted opening 39 in the arcuate extension 18 of the side arm 16. An enlarged opening 40 is formed through the body of the lock plate 35 and provides a purchase face 41 against which an implement, such as a screw-driver blade indicated at 42, may rest when pressure is exerted to lock or release the plate. Formed through the arcuate extension 18 of the side arm 16 is a slotted opening 43 provided with a purchase face 44 which is parallel to the face 41 on the lock plate. When the implement 41 is passed through the opening 40 it will also enter the slotted opening 43 so that pressure may be exerted upon the purchase faces 41 and 44 tending to draw the lock plate over the outer face of the arcuate extension 18 so that the hook end 38 of the lock plate may be introduced into the slot 39 or withdrawn therefrom. Attention is directed to the fact that the portion 36 of the lock plate 35 will depress and deform an area of the cushion strip 28 against which it is forced and that the same action will take place when the hook 38 passes through the opening 39. Thus, in locked position the cushion will bear forcefully against the members 36 and 38 to prevent displacement or rattling of the parts, and will also cooperate in maintaining the hook 38 in its interlocked position with relation to the shoulder 45 of the slotted opening 39.

In operation of the present invention the conduit support is assembled as generally indicated in Fig. 3 of the drawing with the side arms spread apart a sufficient distance to permit the conduit or other element to be gripped to be placed between the arms. When assembled it may prove desirable to turn the cushion strip 29 lengthwise of the conduit along the side arm 16 and to thereafter rotate it into position as shown in the drawing, it being understood that the locking tang 31 will permit this action. Attention is directed to the fact that when the cushion strip is swung to a longitudinal position the bridge 24 will be uncovered so that a central opening 24' therethrough will be available and will make it possible for the screw 15 to be placed in position within the mounting element 10 and rotated to hold the body structure 12 firmly on the mounting member. By this arrangement it will be seen that the head of the screw will press firmly against the base portion 13 of the body member 12 and will hold the body member rigidly upon the mounting. The screw thus in the present instance has only one function, and that is to maintain the support in fixed position upon the mounting 10. This is in counterdistinction to various conduit supports which are made in the form of a loop, and which loop is drawn around the conduit and yieldably resists the action of a screw, which screw must have the double function of clamping the support tightly around the conduit and fastening the support to a mounting element. After the conduit support has been fastened to the mounting element 10 by the screw 15 the cushion strip may be rotated to assume a nested position over the bridge 24 and between the arcuate portions 18 and 19 of the side arms 16 and 17. When in this position the conduit may be laid in place as shown in Fig. 3, after which the arcuate arms 18 and 19 may be compressed to conform generally to the contour of the conduit 11. A screw-driver or like implement 42 is then inserted through the opening 40 in the lock plate 35 and then caused to engage the shoulder 44 of the slot 43, after which the screw-driver is swung in the direction of the arrow a, as indicated in Fig. 2, so that tension will be exerted to pull the two arcuate portions 18 and 19 toward each other and to draw the hook 38 at the end of the lock plate over the shoulder 45 and through the slot 39. This action is performed against the compression of the cushion strip 29. When the implement 42 is withdrawn the compressed cushion 29 will tend to hold the hook 38 in its locked position within the slot 39 and will secure the conduit 11 firmly so that it cannot move longitudinally or circumferentially with relation to the support. Thus, the conduit will be fastened within the support without reference to the screw 15 and will remain firmly gripped without imposing any strain upon the screw 15 which might loosen it.

When the lock plate 35 is in its engaged position as shown in Fig. 2, it will be seen that the bridge 24 will have been flexed downwardly intermediate its ends and that the arcuate arms 18 and 19 will have swung inwardly and around the conduit. Attention is called to the fact that the space occurring between the bridge 24 and the transverse portion 13 when the structure is in its locked position is such as to insure that the upper face of the head of the screw 15 will contact the under face of the portion of the lock strip 29 which is exposed through the opening 24' in the bridge 24. This arrangement insures that a downward pressure will be exerted against the head of the screw 15 to prevent it from rotating or becoming loosened. The bridge provides great strength to the structure and cooperates with the lock plate in holding the conduit against movement and in preventing a strain which would tend to separate the side arms 16 and 17. Attention is directed to the fact that due to this arrangement there is no possibility for the conduit to rest against the screw or to be clamped by it; and furthermore, it is easy to dispose the conduit support at any angle with relation to its mounting 10 without in any wise affecting the gripping action of the device upon the conduit.

It will be obvious that supports of this character may be mounted upon separate rails or placed directly upon a frame structure, and that the conduit or wire bundle will be gripped firmly without vibration.

It is to be understood that while the conduit support has been described as including a cushion strip, that under some circumstances the device may be of service without the use of a cushion strip, and that under such circumstances the conduit support will grip an element placed therein and hold the same firmly.

Attention is directed to the fact that the problem of creating a bond between the metallic parts of the clip and the reinforcing strip is eliminated in the present case, since the metallic parts and the strip interlock through the medium of the tang 31, and for the further reason that when the lock plate is in its gripping position the portions 36 and 38 will be depressed into the surface of the cushion strip 29. In addition, the portion of cushion strip spanning the opening 24' of the bridge 24 will be distended into the opening. Thus, the strip will be held against movement with relation to the parts against which it seats.

It will thus be seen that the structure here disclosed provides means for supporting a conduit, cable, or the like, in a manner to permit the supported element to be placed in position easily or removed therefrom without dismantling the element and without the necessity of removing the support from the structure on which it is mounted.

While I have shown the preferred form of my invention as now known to me, it will be understood that various changes may be made in combination, construction and arrangement of parts by those skilled in the art, without departing from the spirit of my invention as claimed.

Having thus described my invention, what I claim and desire to secure by Letters Patent is:

1. A support for conduits or the like, comprising a metallic clip formed with a central base portion adapted to lie flat against an object upon which it is to be mounted, opposite end portions of said clip being bent to form a pair of opposed side arms terminating in arcuate portions, each representing a length of the circumference of the object to be gripped and adapted to conform to the opposite sides of an object to be gripped, a bridge member interposed between said side arms and having ends extending through and connected to said arms and interlocking therewith, whereby the side arms will be held against a spreading action and the bridge will form an intermediate support for the conduit, and an arcuate lock plate adapted to span the free ends of the side arms and to engage the same whereby the bridge and the arcuate portion of the side arms will combine therewith to embrace and hold the object to be gripped.

2. A conduit support or the like, comprising a body portion formed of a strip of relatively thin metal having a flat central portion adapted to rest against a mounting member, said central portion being formed with a central opening through which a fastening element may pass to the mounting member, the opposite ends of said flat portion continuing in opposed side arms terminating in arcuate lengths combining to partially embrace opposite sides of an object to be supported, an intermediate arcuate bridge the ends of which extend through and are articulately connected to the side arms and spanning the space therebetween, said bridge conforming to the portion of the object to be supported which occurs between the side arms, and fastening means engaging the free ends of the side arms holding them together in their embracing position around the object to be supported.

3. A conduit support or the like, comprising a cushion strip adapted to substantially embrace a conduit, a yieldable metallic clip embracing the cushion strip and the conduit, mounting means carried thereby, a lock plate adapted to overlap and bridge the space between the free ends of said clip and being articulately connected by one end to one of said free ends, a hook upon the opposite end of the plate engaging a lock shoulder upon the opposite end of the clip, and shoulders upon the lock plate and the last named end of the clip to receive a prying tool, and whereby a close bite prying action may be performed between said shoulders to draw the lock plate and the clip elements to and from their locking position.

4. A conduit support or the like, comprising a yieldable mechanical clip formed of a strip of sheet metal to provide a central flat base portion adapted to lie against a fastening support and a pair of opposed clamping arms of substantially equal length and terminating in arcuate portions partially embracing an object to be gripped, an arcuate bridge having opposite end portions interlocking with the two arms and providing a central portion supplementing the arcuate embracing portions of the arms, the flat base portion of the clip being perforated to receive fastening means, a cushion strip lying within the confines of the bridge and the arcuate portion of the arms for substantially embracing an object to be supported, an arcuate lock plate articulately connected to one of the arms of the clip and spanning the free ends thereof, the opposite arm of the clip being formed with a slotted opening, and a hook on the free end of the lock plate adapted to pass through said slotted opening and lock the two arms together as the arms and the resilient strip are drawn to a compressed position around the object to be supported.

5. A conduit support, comprising a substantially U-shaped clip having a flat central portion perforated to receive the shank of a fastening screw, a bridge element, the opposite ends of which interlock with the arms of the clip and span the space between the arms of the clip above the fastening screw, said bridge having a central opening therein through which access to the screw may be attained, locking means spanning the free ends of the arms of the clip, and a resilient cushion strip articulately associated with the clip, whereby it may be moved to a position to uncover the opening through the bridge or may be moved to a position within the clip to embrace an object to be supported.

6. A conduit support or the like, comprising a clip within which a conduit may be embraced and by which it may be supported, said clip including a pair of opposed arms to be disposed around the conduit, a resilient cushion strip disposed between said arms and around a conduit to be gripped, an arcuate lock plate spanning the free ends of the clip arms and the ends of the cushion strip, an articulate connection between one end of the plate and one end of the arms, the plate being formed at its opposite end with an inturned lock hook and a slotted opening adjacent thereto through which a prying tool may pass, the opposite arm of the clip being formed with a pair of parallel slotted openings, one through which the hooked end of the lock plate may pass and the other to receive a prying tool, whereby the resilient cushion strip may be compressed to allow the hook of the lock plate to pass through the lock slot and to engage a wall thereof, whereby it will be held in its locked position by the expansive action of the resilient cushion strip.

MERLE J. WEST.